UNITED STATES PATENT OFFICE.

EDWARD C. MILLER, OF WILLIAMSPORT, PENNSYLVANIA.

LIQUID DAM PREPARATION.

1,417,091. Specification of Letters Patent. Patented May 23, 1922.

No Drawing. Application filed September 30, 1920. Serial No. 413,934.

*To all whom it may concern:*

Be it known that I, EDWARD C. MILLER, a citizen of the United States, and resident of Williamsport, in the county of Lycoming and State of Pennsylvania, have invented certain new and useful Improvements in Liquid Dam Preparations, of which the following is a specification.

My invention has reference to the provision of a dental formulary for closing the pores of mucous membrane, thereby eliminating the moisture in the field of operation, thus dispensing with the use of rubber dams and the like as used in operative dentistry.

It is commonly known that moisture in any field of dental operation causes an early disintegration of cement and porcelain, besides hampering the work of the dentist. Heretofore when a tooth has been prepared for filling and the like a rubber dam has been used to keep moisture from the prepared surface. To accomplish the same and further results in an easier manner than those effected by a rubber dam, I have devised a liquid preparation which retains all of the advantages and eliminates many of the disadvantages of the rubber dam. When cervical margin cavities lie deep under the gum tissues and proximical cavities are very high in the inter-proximical space, the gum tissues must be forced back so far in order to free all margins of the cavity that the rubber dam causes an injury to the pericementum membrane which later develops into pericementitis. There is also eliminated the possibility of the rubber dam becoming dislodged or the penetration of moisture through and around the rubber.

More specifically the principal objects of my invention are: to provide a liquid composition which will prevent moisture from transpiring through the outer surfaces of the membrane; to provide an antiseptic solution for sterilization of the cavity, and applied in the vicinity of the operation; to form in effect a dam which will unfailingly prevent moisture from covering the prepared tooth or teeth; to prevent injury to the pericementum membrane and inflammation of the gum; to provide a dam which in no way interferes with the work of the dentist.

For the purpose of accomplishing the above and other objects I have devised a composition consisting of—

$$\left.\begin{array}{ll}\text{Alcohol} & 99\% \\ \text{Formaldehyde} & \frac{1}{2}\% \\ \text{Menthol} & \frac{1}{2}\%\end{array}\right\} \text{to the oz.}$$

No particular method or proportion is required in combining these ingredients.

My composition is applied locally to the gum by any means suitable to the operator. The application causes a contraction of the pores of the mucous membrane thereby preventing moisture from flowing to the outer surface of the membrane.

Having described the composition and its objects with such attention to detail as will thereby acquaint one skilled in the art with its preparation and advantages, I claim.

A liquid dam preparation comprising a solution of alcohol, menthol in an amount sufficient to produce an astringency and dehydration of the tissue, and substantially one-half of one per cent of formaldehyde.

In testimony whereof I hereunto affix my signature.

EDWARD C. MILLER.